United States Patent [19]

Carlsson

[11] Patent Number: 4,527,972
[45] Date of Patent: Jul. 9, 1985

[54] MACHINE FOR PRODUCING ICE-CREAM

[76] Inventor: Halvard I. Carlsson, Egnahemsvägen 6, S-445 00 Surte, Sweden

[21] Appl. No.: 630,241

[22] Filed: Jul. 12, 1984

[30] Foreign Application Priority Data

Feb. 8, 1984 [SE] Sweden ............................... 8400638

[51] Int. Cl.³ .......................... A23G 3/16; A23G 3/18
[52] U.S. Cl. ...................................... 425/440; 62/340; 249/66 R; 249/127; 249/137; 425/126 S; 425/453
[58] Field of Search ..................... 425/126 S, 110, 117, 425/259, 261, 436 R, 440, 447, 453, 150, 256; 426/515; 249/119, 120, 127, 66 R, 137, 161, 92; 62/340, 345, 356, 380, 381, 382

[56] References Cited

U.S. PATENT DOCUMENTS

| 1,946,442 | 2/1934 | Isenberg | 249/120 |
| 2,083,081 | 6/1937 | Moll | 249/127 |
| 2,088,740 | 8/1937 | Guggenheim | 425/453 |
| 2,811,933 | 11/1957 | Prasz | 425/453 |
| 2,821,943 | 2/1958 | Friedwald | 249/120 |
| 2,843,038 | 7/1958 | Manspeaker | 249/120 |
| 3,082,709 | 3/1963 | Jacobsen | 425/453 |
| 3,620,497 | 11/1971 | Schaff | 249/127 |
| 3,648,625 | 3/1972 | Glass | 425/126 S |
| 3,822,623 | 7/1974 | Wight | 83/327 |
| 3,857,252 | 12/1974 | Wight | 425/126 S |

Primary Examiner—Willard E. Hoag
Attorney, Agent, or Firm—Harness Dickey & Pierce

[57] ABSTRACT

A machine for producing ice-cream units, preferably separate elongate units on a stick known as ice-cream lollies. The ice-cream paste is discharged from nozzles into moulds formed in essentially square plates. The plates are arranged on trays which form a conveyor belt and they are arranged to be lifted off said trays. The machine also comprises means arranged to lift the plates turn them over a quarter of a turn or more and then again lower them onto the conveyor belt.

The ice-cream is discharged into the moulds in the direction of advancement of the conveyor belt and the turning of the plates means that the ice-cream units are accessible from the side for application of sticks or the like.

9 Claims, 3 Drawing Figures

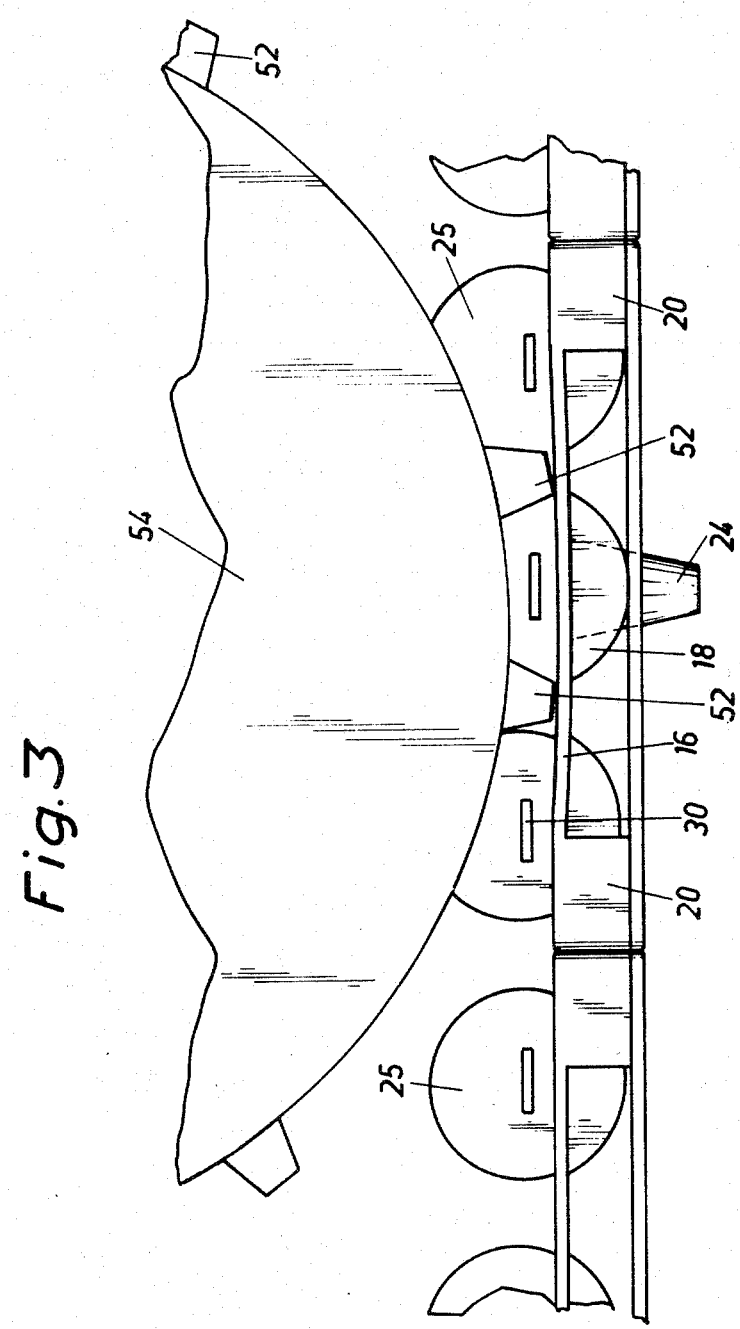

MACHINE FOR PRODUCING ICE-CREAM

BACKGROUND OF THE INVENTION

The subject invention concerns a machine for producing ice-cream units, preferably in the form of ice-creams on sticks, known as ice-cream lollies. The machine comprises a chain-driven belt conveyor consisting of trays and provided with plates which are positioned on the trays and are provided with moulds for reception of the ice-creams.

The prior-art technology for producing ice-creams includes a large number of various methods which are adapted to the kind of ice-creams to be produced, that is, whether in the form of packages, cones or on a stick, so called ice-cream lollies.

According to one prior-art method ice-cream paste is filled into cones, preferably by means of a nozzle which is positioned above an advancing conveyor belt supporting the wafer cones. The wafer cones are advanced continuously and when ice-cream paste is filled into the cones the dispensing nozzles are moved in synchrony with the conveyor belt. This technique is also used to fill ice-cream paste into wafers shaped generally as moulds or boats. Furthermore, the technique is adapted to the production of ice-cream units to be wrapped in packages. Ice-cream units of this kind are produced by dispensing ice-cream paste through a nozzle and cutting it by means of knives or heated wires into units of the desired dimensions which are deposited on a conveyor belt consisting of plates which are forwarded past the ice-cream paste dispensing nozzles. The plates are secured to and driven by a chain. A device of this kind is described in U.S. Pat. No. 3,822,623. The ice-cream conveyor belt advances the ice-creams from the nozzles further up to various treatment stations where the ice-cream units are finished off. Sometimes the ice-creams are to be stored for some period of time in a freezing chamber which is performed by forwarding the ice-creams at a low speed through the freezing chamber on the conveyor belt which travels in several loops through the chamber. As an example of prior-art technology of this kind reference is made to U.S. Pat. No. 3,857,252.

Another prior-art method of producing ice-cream concerns the manufacture of ice-creams on sticks. According to this method a horizontally positioned wheel holding a number of ice-cream moulds in the form of recesses made in the wheel, is made to rotate very slowly while the moulds are filled with ice-cream paste which is dispensed from nozzles positioned above the wheel. The wheel is rotated further and the moulds eventually reach a device designed to insert sticks into the moulds. The device is arranged simply to push sticks into the ice-creams from above. The ice-cream paste is then allowed to freeze and the finished ice-cream lollies are lifted off the moulds and advanced for further treatment.

The method outlined above for the production of ice-cream units on sticks suffers from a number of disadvantages. The moulds which are in the form of recesses made in the wheel impose restrictions as to the possible variations of the configurations of the ice-cream units. The only variation open according to this method is the application of an external layer, such as a chocolate cover. The rotating wheel also means that the ice-cream production method is not adapted to conveyor belt transport of the ice-cream units at a low speed into and inside the freezing chamber. This lack of adaptability results in a rate of productivity much below the desired one in the manufacture of ice-cream units.

SUMMARY OF THE INVENTION

The purpose of the subject invention is to provide a machine for the production of ice-cream units, preferably in oblong shapes and on sticks. The machine in accordance with the invention is designed to enable high productivity and to make it possible to manufacture ice-cream units in a versatile and flexible manner which may be adapted to different needs and ice-cream shapes. These objectives are achieved in accordance with the invention by providing a machine which is characterized in that the plates are essentially square, in that they are arranged to be lifted off their respective supporting tray and in that they are adapted to be deposited on the trays in different positions, each one of which corresponds to the turning of the plate over at least a quarter of a turn. Further characteristics and advantages of the machine in accordance with the invention will become apparent from the following description and the dependent claims.

BRIEF DESCRIPTION OF THE DRAWINGS

The machine in accordance with the invention will be explained in closer detail in the following with reference to the accompanying drawings, wherein FIG. 3 is a lateral view of an additional detail component incorporated in the machine in accordance with the invention.

DETAILED DESCRIPTION OF A PREFERRED EMBODIMENT

Figure 2:
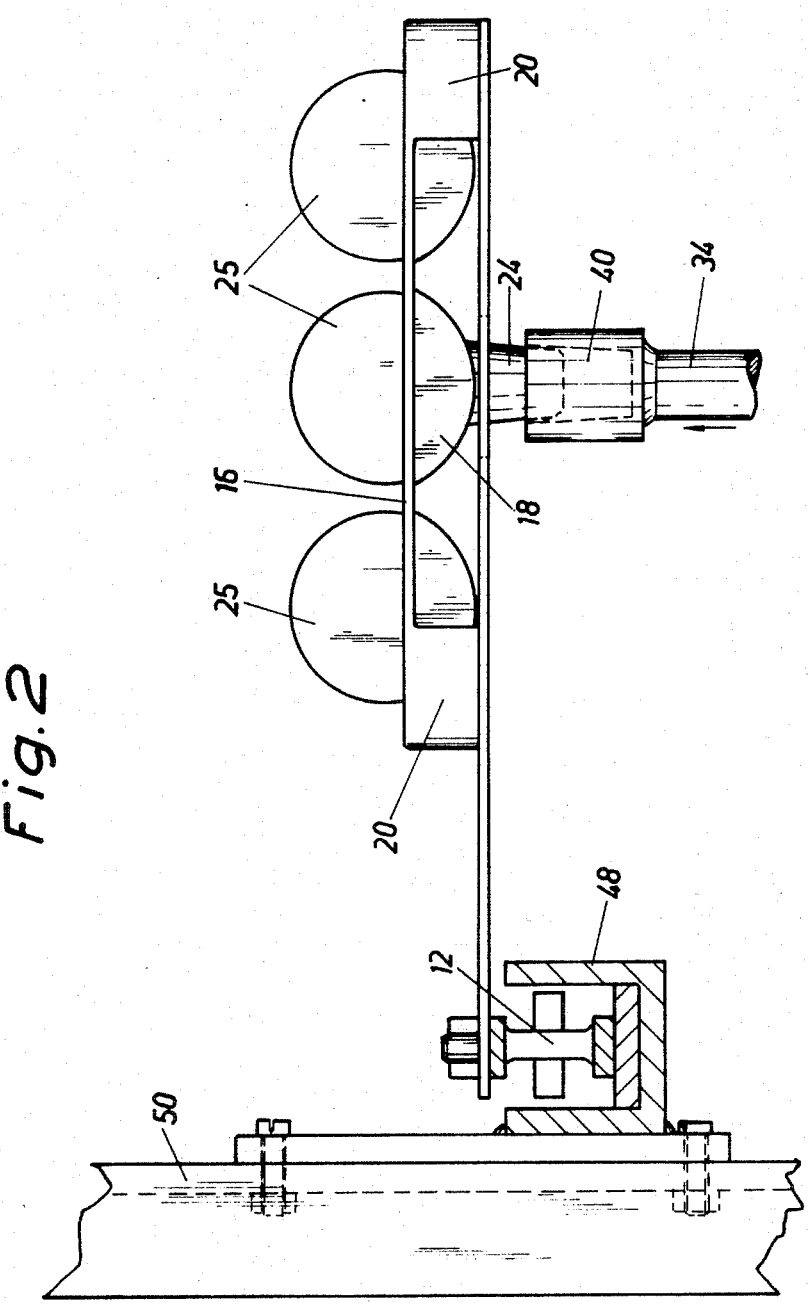
FIG. 2 is a cross-sectional view on an enlarged scale along line II—II of FIG. 1 of a number of detail components incorporated in the machine in accordance with the invention.

The machine in accordance with the invention comprises a conveyor belt 10 for advancement of the ice-cream units, said belt comprising a number of essentially rectangular trays 14 which are anchored to and driven by a drive chain 12 (see FIG. 2). On each one of the trays is positioned a plate 16 which is formed with a number of moulds 18, in accordance with the embodiment illustrated, six moulds, for the production of ice-cream units in the form of ice-cream lollies. The moulds 18 are in the form of bowl-shaped depressions formed in the plates 16. Each plate 16 comprises six moulds which are arranged in two groups of three moulds 18 each.

The plates 16 are essentially square with the sides corresponding to the width of the tray 14. The plate 16 is supported on the tray 14 by means of supports 20 provided at the plate corners. At its centres the plate is provided with an aperature 22 underneath which is provided a hollow frusto-conical member 24 which is adapted to surround the lower face of the aperture 22. At its bottom part the frusto-conical member 24 has an essentially square cross-sectional shape. The plates 16 may be stacked one into the other.

The moulds 18 are filled with ice-cream paste 25 from discharge nozzles 26 (see FIG. 1) arranged side by side. The nozzles are mounted on a discharge device 28 which is controlled so as to ensure that upon completion of discharge of ice-cream paste into a group of three elongate moulds 18 the discharge device follows the conveyor belt for a brief period of time and is then rapidly moved back to its discharge position above the following group of three moulds. Upon reception of the ice-cream paste the plates 16 are arrenged in such a way that the moulds extend in the direction of movement of the conveyor belt. Discharge of ice-cream paste from the nozzles 26 may be interrupted, following filling of a group of three moulds, in a manner known per se with the aid of a knife or a heated wire which cuts off the string of ice-cream paste being discharged.

Figure 1:
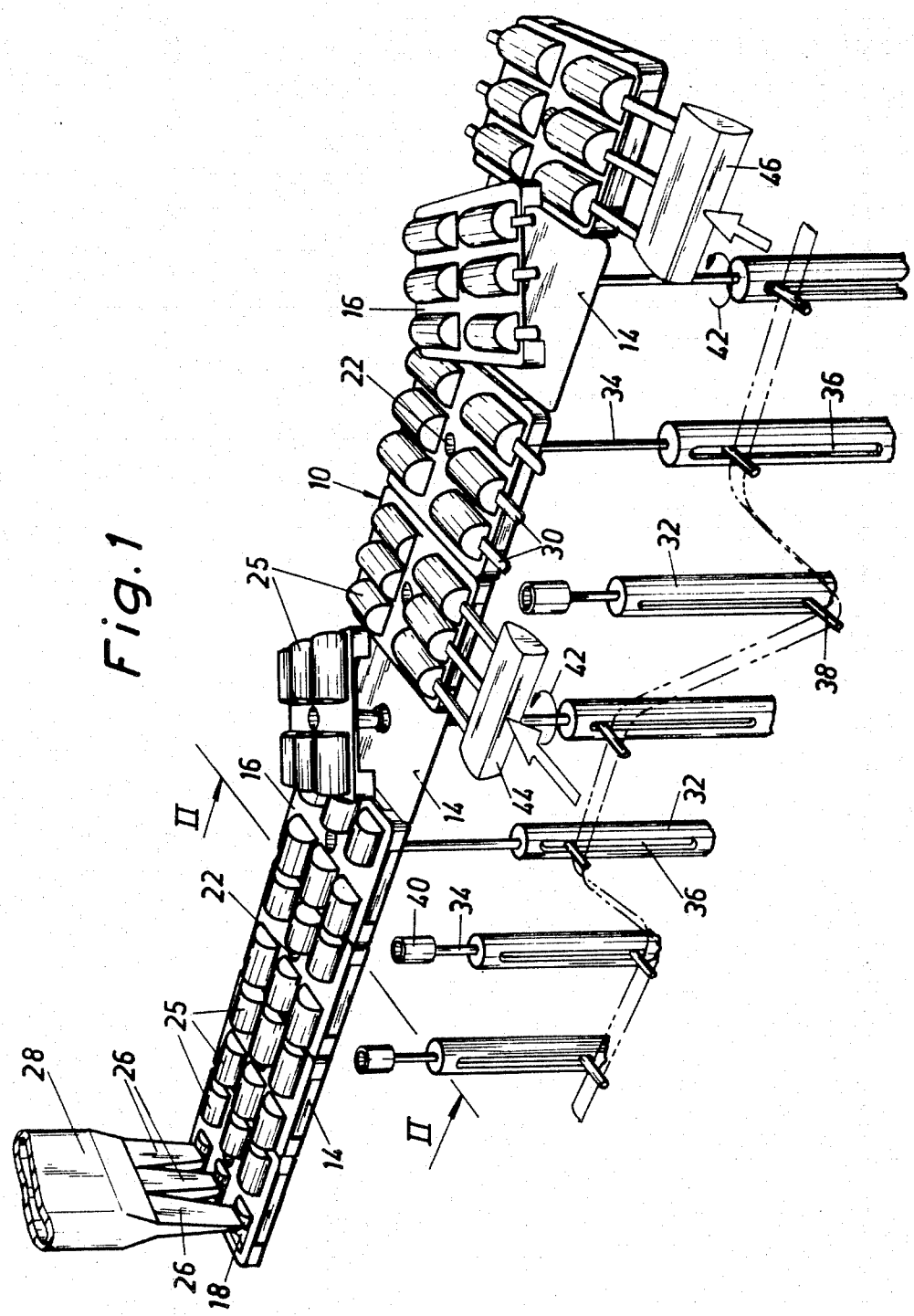
FIG. 1 is a perspective overall view of a machine in accordance with the invention for the production of ice-cream units, preferably in the form of ice-creams on sticks.

When the ice-cream paste has been filled into the moulds 18 the plates 16 must be turned over a quarter of a turn in order to be accessible from the side for insertion of sticks 30. The turning movement is effected by cylindrical means which are arranged to move in synchrony with the advancement of the conveyor belt 10 below the latter, one cylinder 32 being positioned underneath each tray 14. The cylinders 32 preferably are driven by a separate chain the movements of which are synchronized with those of the chain 12 driving the belt conveyor. A rod 34 is vertically movable inside each cylinder 32 and is operative to perform movements vertically by means of a pin 38 projecting through a slot 38 in the cylinder. The rod 34 is provided at its upper end with a sleeve 40 (see FIG. 2) which is shaped to allow engagement with the frusto-conical member 24. The sleeve preferably has an internal square cross-sectional shape. This provides for engagement between the sleeve and the frusto-conical member 24, which makes it possible to obtain a controlled angular movement of the plate 16. This angular movement is represented in FIG. 1 by arrows 42 and is performed when the plates 16 are raised above the conveyor belt by means of mechanically or possibly electronically operated control means. FIG. 1 shows two turning movements of the plate 16, a first turn over a quarter of a turn from the position that the plate 16 assumes when the ice-cream paste is discharged to a position in which the sticks 30 are inserted into the ice-cream units by means of a first insertion means 44, and a second turning movement over half a turn to make the ice-cream items on the other side of the plates 16 accessible for insertion thereinto of sticks 30 by means of a second stick insertion means 46. The second turning movement could be performed in two separate stages, a quarter of a turn each time.

The stick-insertion means 44, 46 must be positioned on the same side of the conveyor belt 10 for space-saving reasons. The chain 12 (see FIG. 2) is arranged to travel in a manner known per se in a U-beam 48 which is mounted on a wall 50. The trays 14 are attached to the chain 12 at the articulation points of the chain links. It is advantageous to use a chain having comparatively long links. The length of the links may thus be 125 mm. The wall 50 and the chain 12 make it difficult to provide insertion means for insertion of sticks on either side of the conveyor belt 10.

The machine in accordance with the invention also comprises a wheel 54 with cogs 52 thereon, which wheel 54 is arranged to loosen the ice-cream items 25 from the plate 16. While being transported through the freezing chamber having a temperature of $-40°$ C., the ice-cream freezes and sticks comparatively hard to the mould 18. When the plate 16 passes the wheel 54 the cogs 52 thereon abut against the side edge of the plate adjacent the ice-cream units 52 intermediate the sticks 30 therein and cause the plate 16 to bend downwards. This bending downwards of the plate causes the ice-creams 25 to loosen automatically from their associated moulds. In a similar manner the ice-cream units at the opposite side of the plate 16 are loosened by means of an identical wheel (not shown) positioned on the opposite side. The loosened ice-cream units may then simply be lifted from the plate 16.

The machine in accordance with the invention makes the ice-cream units accessible from above during their advancement and allows the use of discharge nozzles and other discharge means (not shown) to apply e.g. decoration and flavoured coatings, such as chocolate coatings, hundreds and thousands, jam and the like on the ice-cream units.

The machine in accordance with the invention comprises a conveyor belt 10 which is designed to allow it to pass through a freezing chamber with the result that it becomes possible to manufacture ice-cream units in a considerably more rationalized way than has hitherto been possible with machines of prior-art kind.

The embodiment of the invention described in the aforegoing and illustrated in the drawings is to be regarded as an example only and a number of modifications are possible within the scope of the appended claims. The plates 16 comprises six moulds 18 arranged in groups of three. This arrangement naturally could be altered. The moulds 18 and their design and appearance as well as the dispensing device 28 could be adjusted to suit the configuration of the ice-cream items to be produced. The items could be of the conventional elongate lolly-type shape or could be essentially flat and rectangular or of any other desired shaped.

What I claim is:

1. In a machine for producing ice-cream units, said machine comprising a belt conveyor, a number of trays forming said belt conveyor, a chain driving said belt conveyor, and plates on said belt conveyor, said plates positioned on said trays and having molds formed therein for reception of ice-cream paste, the improvement comprising:

said plates being essentially square, and means for lifting one of said plates from said conveyor and turning said one of said plates at least a quarter of a turn said plates being arranged to be lifted off their respective supporting trays and adapted to be positioned on said trays in different positions, each one of said positions corresponding to the turning of the plate over at least a quarter of a turn.

2. An improved machine as claimed in claim 1, wherein said moulds are formed in said plates in groups of adjacent moulds.

3. An improved machine as claimed in claim 1, comprising a number of operating members arranged to be displaced in synchrony with the advancement of aid conveyor belt together with their respective trays, and guide means adapted to control said operating members so that said operating members lift and turn said plates to their desired angular positions.

4. An improved machine as claimed in claim 1, comprising a central aperture formed in each one of said plates, bottom faces on said plates, means provided on said plate bottom faces in alignment with said apertures, said means formed essentially as hollow frusto-conical members, a number of operating members arranged to be displaced in synchrony with the advancement of said conveyor belt together with their respective trays, and guide means adapted to control said operating members so that said operating members lift and turn said plates to their desired angular positions, said operating members positioned below the lower face of said conveyor, each operating member comprising a sleeve arranged to be lifted, lowered and turned, said sleeves adapted for engagement with said frusto-conical members on the lower faces of said plates.

5. An improved machine as claimed in claim 1, comprising at least one means arranged to move into abutment against said plates so as to bend the latter, allowing ice-cream units which stick to said moulds when frozen, to be loosened therefrom.

6. An imnproved machine as claimed in claim 5, comprising at least one wheel with cogs thereon, said at least one wheel forming said at least one means arranged to bend downwards said plates formed with said moulds.

7. An improved machine as claimed in claim 1, comprising a central aperture formed in each one of said plates.

8. An improved machine as claimed in claim 7, comprising bottom faces on said plates, means provided on said plate bottom faces in alignment with said apertures, said means formed essentially as hollow frusto-conical members.

9. An improved machine as claimed in claim 7, comprising bottom faces on said plates, means provided on said plate bottom faces in alignment with said apertures, said means formed essentially as hollow frusto-conical members, said frusto-conical members having a square cross-sectional shape at least at their bases.

* * * * *